(12) United States Patent
Baros et al.

(10) Patent No.: US 7,806,142 B2
(45) Date of Patent: Oct. 5, 2010

(54) COMBINED RELIEF VALVE AND CHECK VALVE

(75) Inventors: Davor Baros, Vancouver (CA); Mark Ellens, Richmond (CA)

(73) Assignee: Teleflex Canada Inc., Richmond (CA)

( * ) Notice: Subject to any disclaimer, the term of this patent is extended or adjusted under 35 U.S.C. 154(b) by 688 days.

(21) Appl. No.: 11/769,643

(22) Filed: Jun. 27, 2007

(65) Prior Publication Data
US 2009/0000675 A1   Jan. 1, 2009

(51) Int. Cl.
*F16K 11/10* (2006.01)
(52) U.S. Cl. ............ 137/878; 137/539; 137/614.2
(58) Field of Classification Search ............ 137/539, 137/601.2, 614.2, 878
See application file for complete search history.

(56) References Cited

U.S. PATENT DOCUMENTS

| 2,970,467 | A | * | 2/1961 | Pettibone | ............ | 73/1.72 |
| 3,107,417 | A | * | 10/1963 | Jaquish, Jr. et al. | ..... | 29/890.124 |
| 3,974,861 | A | * | 8/1976 | Goto et al. | ............ | 137/627.5 |
| 4,231,443 | A | | 11/1980 | van der Lely | | |
| 4,249,499 | A | | 2/1981 | Perr | | |
| 4,616,677 | A | * | 10/1986 | Krechel et al. | ............ | 137/881 |
| 4,836,245 | A | * | 6/1989 | Takahashi et al. | ...... | 137/601.13 |
| 4,873,817 | A | | 10/1989 | Harms | | |
| 6,283,138 | B1 | | 9/2001 | Friend et al. | | |

FOREIGN PATENT DOCUMENTS

GB         2012025 A      12/1978

* cited by examiner

*Primary Examiner*—John Fox
(74) *Attorney, Agent, or Firm*—Cameron IP (57) ABSTRACT

A combination check valve and relief valve has a valve body with an inlet, an outlet, and a valve chamber operatively interposed between the inlet and outlet. A check valve may be integrated with the relief valve and therefore simplify a hydraulic system. The valve includes a relief valve member which is within the valve chamber. The valve also includes a resilient member with a first end and a second end. The first end of the resilient member operatively engages the relief valve member. The valve includes a setting member pressure-fit within the valve chamber to operatively engage the second end of the resilient member. The resilient member is resiliently biased between the setting member and the relief valve member to bias the relief valve member against a relief valve seat, whereby, when pressurized fluid communicates with the inlet, the resilient member is compressed, and the relief valve member disengages its seat to enable the fluid to pass through to the outlet.

18 Claims, 10 Drawing Sheets

COMBINED RELIEF VALVE AND CHECK VALVE

BACKGROUND OF THE INVENTION

Marine tilt and trim systems conventionally use a check valve and a relief valve in connecting a top and a bottom of a hydraulic cylinder to a reservoir tank. A hydraulic conduit connecting the top of the hydraulic cylinder to the reservoir communicates with the check valve. The check valve allows for fluid to be drawn from the reservoir to the top of the cylinder, but prevents fluid from flowing from the top of the cylinder to the reservoir. A hydraulic conduit connecting the bottom of the hydraulic cylinder to the reservoir communicates with the relief valve. The relief valve is necessary for circumstances requiring tilt (or trim) relief, or a quick removal of fluid from the bottom of the cylinder. Examples where fluid removal or relief from the bottom of the cylinder is required include: 1) relief from thermal expansion if the fluid within the cylinder expands; and 2) relief from impulses from the propeller.

Conventionally, two separate valves are used for the above system. The check valve conduit is separate from the conduit involving the relief valve. As a result, an excessive amount of hydraulic conduits are used. Also, both check valves and relief valves can be quite expensive. For relief valves in particular, there is a significant cost associated with manufacturing relief valves which are correctly and accurately made to consistently open at target, set pressures.

Accordingly, there is a need for a relief valve which can be consistently set to a desired relief pressure in a more economically advantageous manner. In the context of marine tilt and trim systems, there is a further need to reduce the number of parts and costs required in providing a check valve and relief valve system.

SUMMARY OF THE INVENTION

One aspect of the invention involves a relief valve comprising a valve body. The valve body has an inlet and an outlet, and a valve chamber. The valve chamber is within the valve body. The valve chamber is operatively interposed between the inlet and the outlet of the valve body. The relief valve includes a relief valve member which is within the valve chamber. The relief valve includes a relief valve seat adjacent to the relief valve member. The relief valve includes a resilient member. The resilient member has a first end and a second end. The first end of the resilient member operatively engages the relief valve member. The relief valve includes a setting member. The setting member is pressure-fit within the valve chamber at a target position. The target position of the setting member is set by passing pressurized fluid through the valve chamber from the inlet to the outlet, applying force to the setting member to move the setting member within the valve chamber, the setting member operatively engaging the resilient member and biasing the resilient member against the valve member, and increasing the force applied to the setting member until the fluid reaches a target pressure. The resilient member is resiliently biased between the setting member and the relief valve member to bias the relief valve member against the relief valve seat, whereby, when a fluid of a greater than or equal to the target pressure communicates with the inlet of the valve, the resilient member is compressed, and the relief valve member thereby disengages from the relief valve seat to enable the fluid to pass through to the outlet of the valve body.

According to another aspect, the invention involves a combination check and relief valve apparatus. The apparatus includes a housing member. The housing member has an inlet, a first outlet, a second outlet and a hollow housing interior. The apparatus includes a valve body. The valve body is within the housing interior. The valve body has an inlet port, a first outlet port, and a second outlet port. The inlet port communicates with the inlet of the housing member. The first outlet port is adjacent to the first outlet of the housing member. The second outlet port communicates with the second outlet of the housing member. The apparatus includes a valve chamber. The valve chamber is within the valve body. The apparatus includes a check valve member. The check valve member is interposed between the first outlet port of the valve body and the first outlet of the housing member. The apparatus includes a check valve seat. The check valve member is biased against the check valve seat when fluid pressure is applied to the first outlet. The apparatus includes a relief valve member. The relief valve member is within the valve chamber. The relief valve member is operatively interposed between the inlet port and the first outlet port. The relief valve member is also operatively interposed between the inlet port and the second outlet port. The apparatus includes a resilient member. The resilient member has a first end and a second end. The first end of the resilient member operatively engages the relief valve member. The apparatus includes a setting member. The setting member is pressure-fit within the valve chamber and operatively engages the second end of the resilient member. The apparatus includes a relief valve seat. The resilient member is resiliently biased between the setting member and the relief valve member to bias the relief valve member against the relief valve seat, whereby the setting member is so pressure-fit that when a fluid of a greater than or equal to a target pressure communicates with the inlet port of the valve body, the resilient member is compressed. The relief valve member thereby disengages from the relief valve seat to enable the fluid to pass through the valve chamber. The fluid then disengages the check valve member from the check valve seat so that the fluid in part passes through to the first outlet of the housing member, and the fluid in part passes through the valve chamber to the second outlet of the housing member.

Alternatively, the invention can be described as a method for setting a valve opening pressure for a relief valve. The relief valve comprises a valve body. The valve body has an inlet port and an outlet port, a valve chamber. The valve chamber is within the valve body. The valve chamber is in communication with the inlet port and the outlet port. The method comprises placing a valve member within the valve chamber. The valve member is operatively interposed between the inlet port and the outlet port. The method includes positioning the valve member on a valve seat. The valve seat is sealingly engageable with the valve member. The method includes inserting a resilient member within the valve chamber so that the resilient member is against the valve member on a surface of the valve member opposite the valve seat. The method includes placing a setting member within the valve chamber so that the resilient member is between the setting member and the valve member. The setting member is sized to pressure fit within the valve chamber. The setting member has a first surface and a second surface. The first surface faces the resilient member. The method further includes applying pressurized fluid to the valve chamber at the second surface of the setting member to move the setting member within the valve chamber to a position determined by the pressurized fluid. The setting member thereby operatively engages the resilient member and biases the resilient member against the valve member. As a result, when a fluid of a greater than or equal to a given pressure communicates with the inlet port of the valve, the resilient member is compressed, and the valve member thereby disengages from the valve seat to enable fluid to pass through to the outlet port of the valve.

BRIEF DESCRIPTION OF THE DRAWINGS

Referring to the drawings.

DETAILED DESCRIPTIONS OF THE PREFERRED EMBODIMENTS

Figure 1:
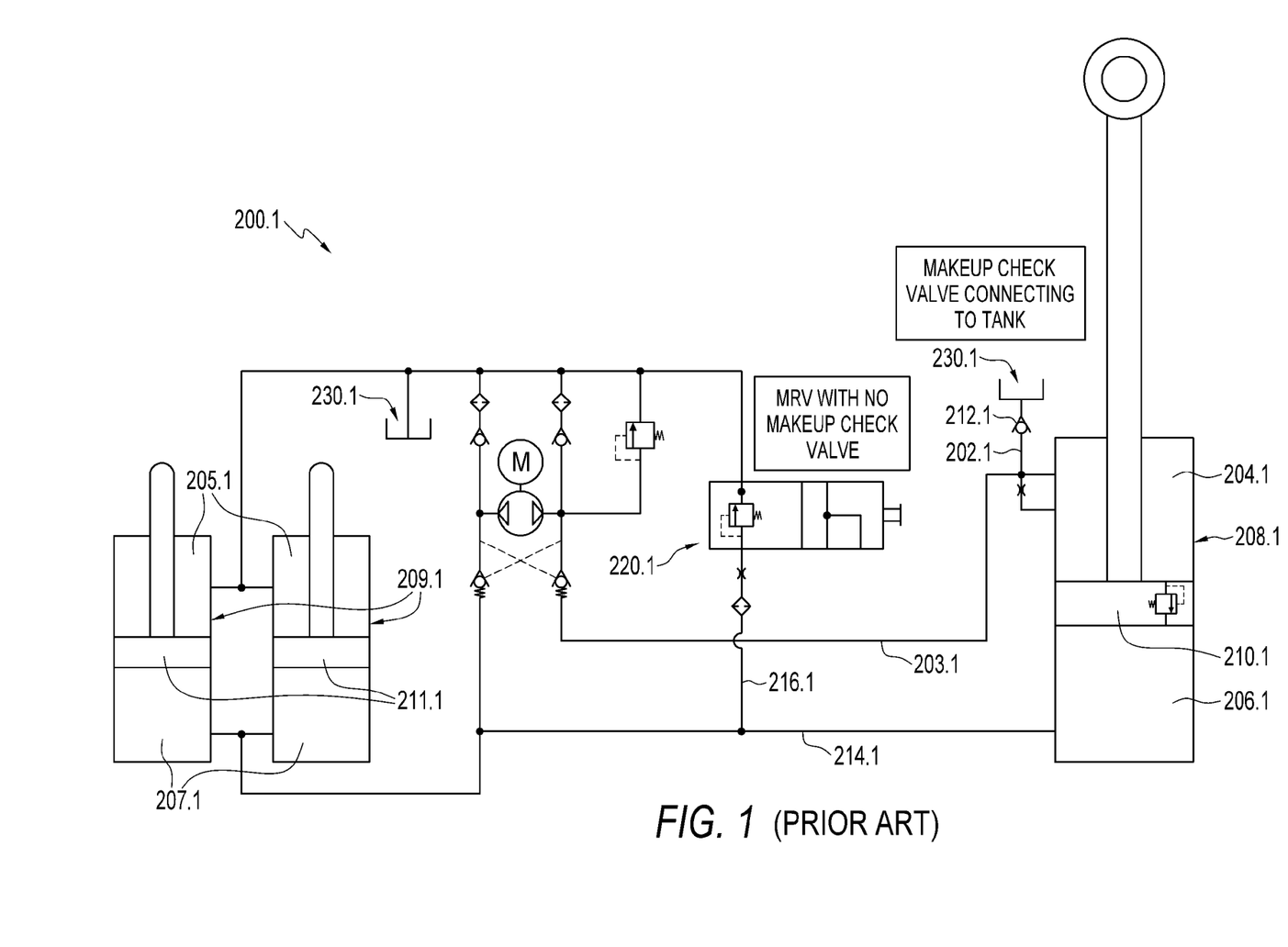
FIG. 1 is a schematic diagram of a hydraulic power trim and tilt system according to the prior art.

Referring to the drawings and first to FIG. 1, this illustrates a conventional marine power trim and tilt system 200.1 having a check valve 212.1 and a relief valve 220.1 according to the prior art. A hydraulic conduit 202.1 connects a top 204.1 of a hydraulic cylinder, in this example, tilt cylinder 208.1, to a reservoir 230.1. The hydraulic conduit 202.1 communicates with the check valve 212.1. The check valve 212.1 allows for fluid to be drawn from the reservoir 230.1 to the top 204.1 of the tilt cylinder 208.1. Separate hydraulic conduits 214.1 and 216.1 connect a bottom 206.1 of the tilt cylinder 208.1 to the relief valve 220.1.

Figure 2:
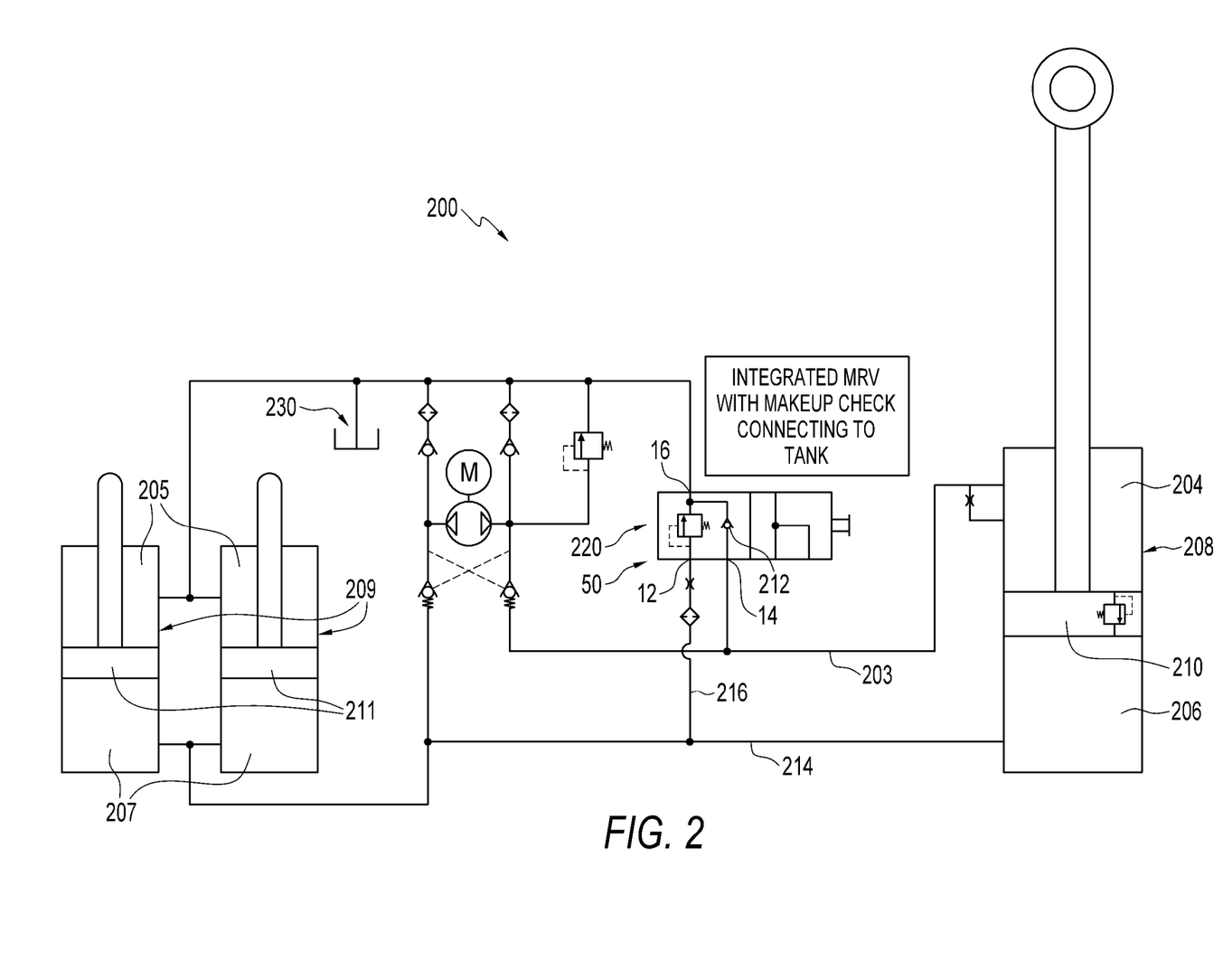
FIG. 2 is a schematic diagram of a hydraulic power trim and tilt system having a valve assembly according to an embodiment of the invention.

Referring to FIG. 2, this illustrates an embodiment of the invention where like parts have like numbers to FIG. 1 absent the additional numeral designation "0.1". FIG. 2 illustrates a marine power trim and tilt system 200. The marine power trim and tilt system 200 includes a valve assembly 50 comprising combined check valve 212 and relief valve 220. The check valve 212 is connected to a top 204 of a tilt cylinder 208 by a hydraulic conduit 203. The check valve 212 is also connected to the reservoir 230. As a result, a separate hydraulic conduit, illustrated in the prior art as numeral 202.1 in FIG. 1, is not required in FIG. 2. The relief valve 220 is connected to a bottom 206 of the tilt cylinder 208 by hydraulic conduits 214 and 216.

In light of the above, a separate check valve is no longer required in the present invention. This is because the valve assembly 50 combines both the check valve 212 and the relief valve 220.

FIG. 2 further illustrates that the tilt cylinder 208 has a tilt piston 210. Also there are a pair of trim cylinders 209. The trim cylinders 209 have bottoms 207 which are operatively connected to the relief valve 220. The trim cylinders 209 in this example are trim barrels. Tops 205 of the trim cylinders 209 are operatively connected to the reservoir 230. The trim cylinders 209 have trim pistons 211.

Figures 3, 3A:
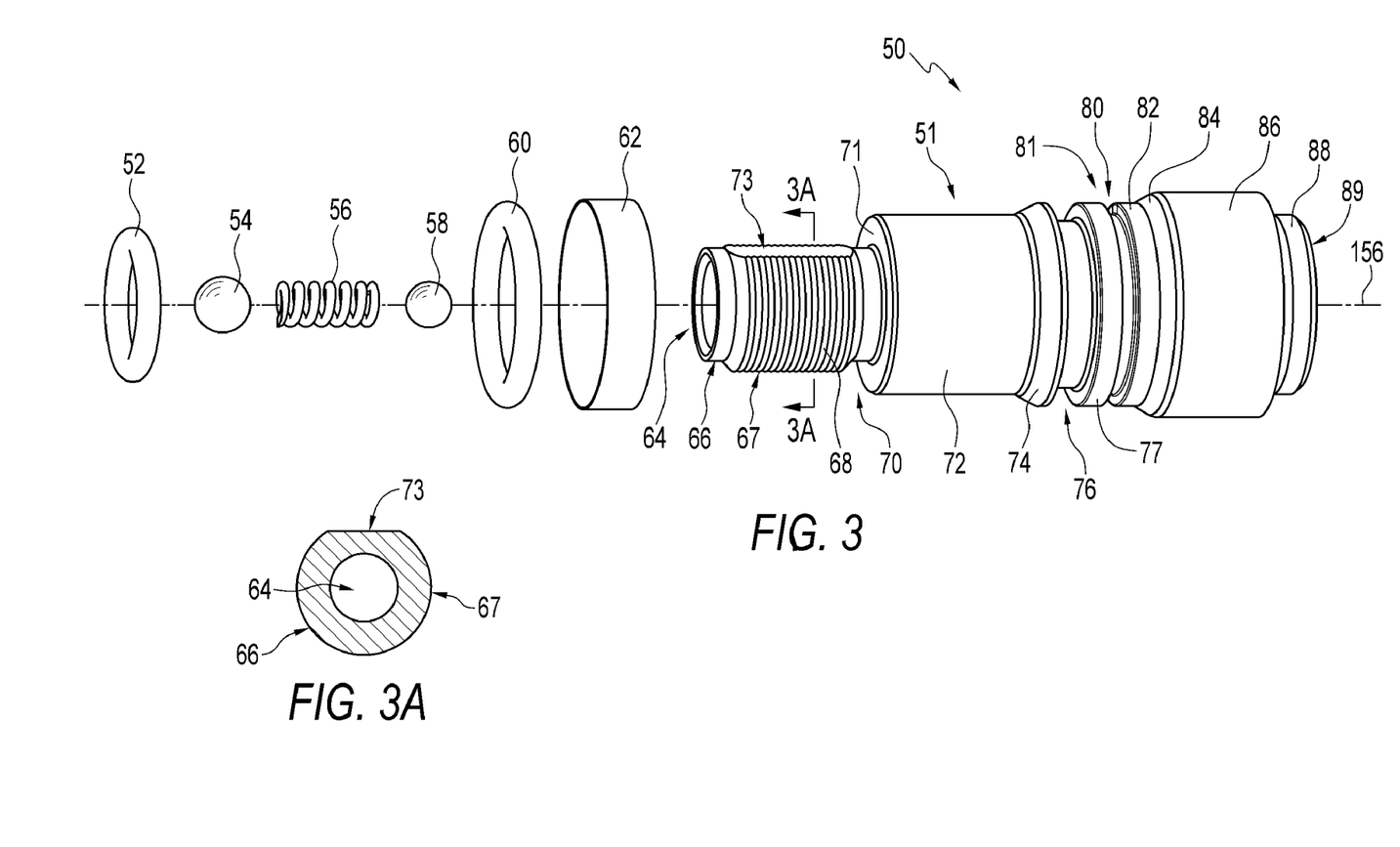
FIG. 3 is a simplified exploded view showing a valve assembly according to an embodiment of the invention.
FIG. 3A is a sectional view of FIG. 3 illustrating a non-threaded portion of the valve assembly.

Referring now to FIG. 3, this illustrates the valve assembly 50 in greater detail. FIG. 3 is an exploded view of the valve assembly 50. The valve assembly 50 has a valve body 51 with an axially extending, generally cylindrical profile, with reference to longitudinal axis 156. All mention of inward and outward directions are made herein with reference to the axis 156 as shown in FIG. 3.

The valve body 51 has a first end 89 and a second end 66. The first end 89 of the valve body 51 has a groove 91 illustrated in FIG. 5. In this example, the groove 91 is a screw driver slot. Referring back to FIG. 3, a cylindrical wall 88 is adjacent to the first end 89 of the valve body 51. Extending outward from the wall 88 is a cylindrical surface 86. A frustoconical surface 84 extends from the surface 86. A cylindrical wall 82 extends from the frustoconical surface 84. The cylindrical wall 82 has an annular groove 80. There is an inlet port 81 of the valve body 51 which in this embodiment is disposed within the annular groove 80. The inlet port 81 allows for fluid entry into the valve body 51. There is a filtering screen 62 which is so shaped as to abut walls 82 and 77. The filtering screen 62 inhibits debris from entering into the valve body 51 which may otherwise cause damage to the interior of the valve body 51. The filtering screen 62 is only illustrated in FIG. 3 and is not shown in the other figures. The valve body 51 has an annular groove 76 which is separated from the annular groove 80 by wall 77. The annular groove 76 is so shaped to accept a first o-ring 60, as illustrated in FIG. 4.

Adjacent to the annular groove 76 is a frustoconical surface 74, which is adjacent to a cylindrical wall 72. A transverse wall 71 of the valve body 51 abuts wall 72. This is next to an annular groove 70 which is so shaped to accept a second o-ring 52, as illustrated in FIG. 4. Referring back to FIG. 3, extending past the annular groove 70 is a surface 68. Threading 67 extends along surface 68. There is an non-threaded portion 73 as illustrated in greater detail in FIG. 3A. Referring now to FIG. 4, the non-threaded portion 73 extends along the longitudinal axis 156 where otherwise there would be threading 67. The non-threaded portion 73 may be formed by flattening the threading along this section. Referring back to FIG. 3, adjacent to the second end 66 is a first outlet port 64. The first outlet port 64 communicates with a valve chamber 108, as illustrated in FIG. 4.

Figure 4:
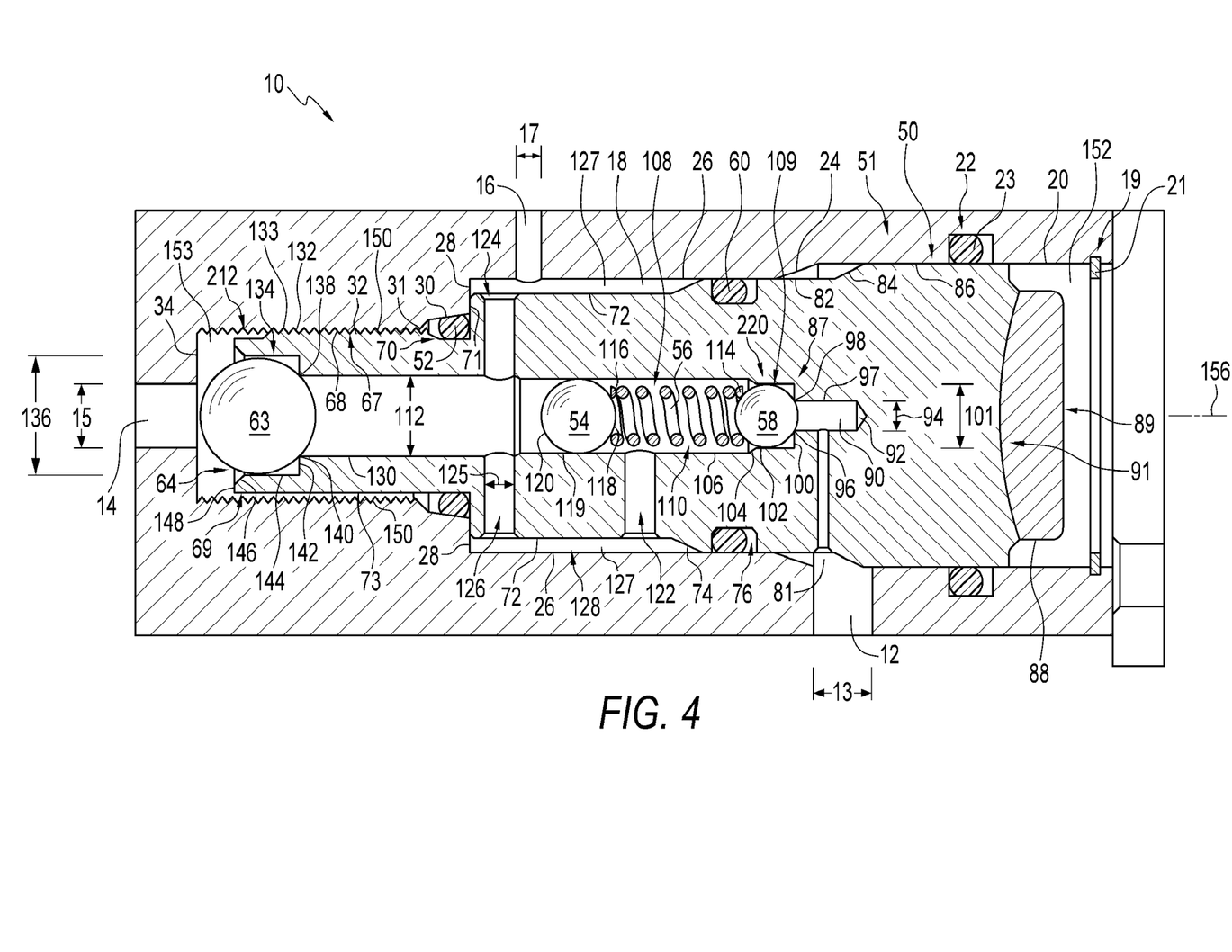
FIG. 4 is a sectional side view of the combination check and relief valve within a housing member, according to an embodiment of the invention.

FIG. 4 is a cross-sectional view providing greater detail of the valve assembly 50. A relief valve member 58 is disposed within the valve body 51. In this example, the relief valve member 58 is a relief valve ball. The relief valve member 58 is next to a resilient member 56. The resilient member 56 in this embodiment is a coil spring. The resilient member 56 is also disposed within the valve body 51. Lastly, there is provided a setting member 54, which, in this example, is a setting ball. The setting member 54 is likewise disposed within the valve body 51.

The valve assembly 50 is disposed within an interior 18 of housing member 10. Three ports of the valve body 51 are illustrated: an inlet port 81, the first outlet port 64, and a second outlet port 124. The inlet port 81 extends inwardly within the valve body 51 to an inlet bore 90. The inlet port 81 may act as a flow restrictor. The inlet bore 90 has a cross-section 94, a closed end 92, and a cylindrical wall 97 extending from the closed end 92. The inlet bore 90 extends from a first end 87 of the valve chamber 108, also referred to herein as interior bore. The valve chamber 108 includes a relief valve section 109. In this example, the relief valve section 109 has a larger cross-section 101 than that of the inlet bore 90. An end surface 100 interfaces the relief valve section 109 and the inlet bore 90. A relief valve seat 98 is interposed between the inlet bore 90 and the relief valve section 109. The relief valve seat in this embodiment comprises the abutting wall 97 and end surface 100 which together form a corner 96. The relief valve member 58 is biased against the relief valve seat 98. The relief valve 220 includes the relief valve member 58 and relief valve seat 98. A cylindrical wall 102 extends from the end surface 100. The cylindrical wall 102 is adjacent to the relief valve member 58 and extends to an outwardly tapered wall 104.

The relief valve section 109 of the valve chamber 108 extends into a setting member section 110, which is also a part of the valve chamber 108. The setting member section 110 has a cylindrical wall 106 connected to the outwardly tapered wall 104. The setting member section 110 has a cross-section 112 which is larger than the cross-section 101 of the relief valve section 109. The resilient member 56 is within the setting member section 110. The resilient member 56 has a first end 114 and a second end 116. The first end 114 of the resilient member 56 abuts the relief valve member 58. The setting member 54 is within the setting member section 110. The setting member has a first surface 118 and a second surface 120. The setting member 54 is so sized as to pressure-fit within setting member section 110 of the valve chamber 108 and compress the resilient member 56. In this pressure-fit process, pressure is exerted against the second surface 120 of the setting member 54. As a result, the first surface 118 of the setting member 54 abuts the second end 116 of the resilient member 56, the first end 114 of the resilient member 56 biases against the relief valve member 58, and the relief valve member 58 is in turn biased against the relief valve seat 98.

The valve body 51 has a first interior conduit 122 which extends from setting member section 110. A second interior conduit 126 also extends from the setting member section 110. Cylindrical wall 119 extends from the first interior conduit 122 to the second interior conduit 126. The setting member 54 abuts cylindrical wall 119. An annular passage 127 is formed by enclosing wall 72 and frustoconical surface 74 of the valve body 51, in combination with walls 26 and 28 of the housing member 10. A passageway 128 is formed by the first interior conduit 122 and annular passage 127.

Both the second outlet port 124 and second outlet 16 are in communication with the passageway 128. The second outlet port 124 extends outwardly from the setting member section 110. In this embodiment, the second interior conduit 126 and the second outlet port 124 are aligned and have substantially equal cross-sections 125 though this is not essential.

An outlet bore 134 extends from a second end 132 of the valve chamber 108. Cylindrical wall 130 extends between the outlet bore 134 and the second interior conduit 126. The outlet bore 134 has a cross-section 136 which is larger than the cross-section 112 of the valve chamber 108. An end surface 142 interfaces the valve chamber 108 and the outlet bore 134. A check valve seat 138 is interposed between the valve chamber 108 and the outlet bore 134. The check valve seat 138 in this embodiment comprises the abutting wall 130 and end surface 142 which together form a corner 140.

In the mode of the present invention illustrated in FIG. 4, a check valve member 63 abuts the check valve seat 138. In this embodiment, the check valve member 63 is a check valve ball. The check valve 212 includes the combination of the check valve member 63 and valve seat 138. The outlet bore 134 is so shaped as to loosely extend around the check valve member 63. A cylindrical wall 144 extends from the end surface 142. The cylindrical wall 144 is adjacent to the check valve ball 63 and extends to an outwardly tapered wall 146 and wall end 148. The end of the outlet bore 134 coincides with the first outlet port 64 of the valve body 51.

Figure 6A:
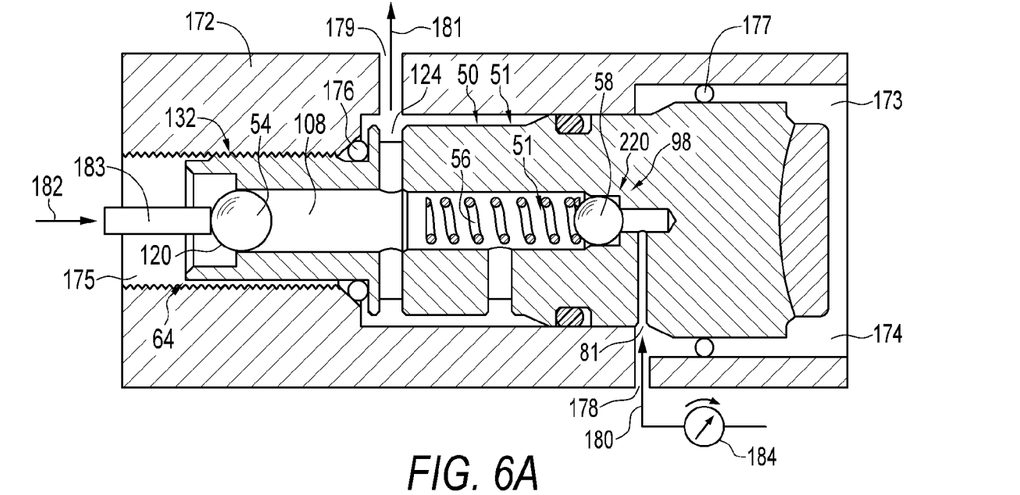
FIGS. 6A and 6B are split sectional side views of the combination check and relief valve illustrating the pressuring fitting of the setting member within the valve.
Figure 6B:
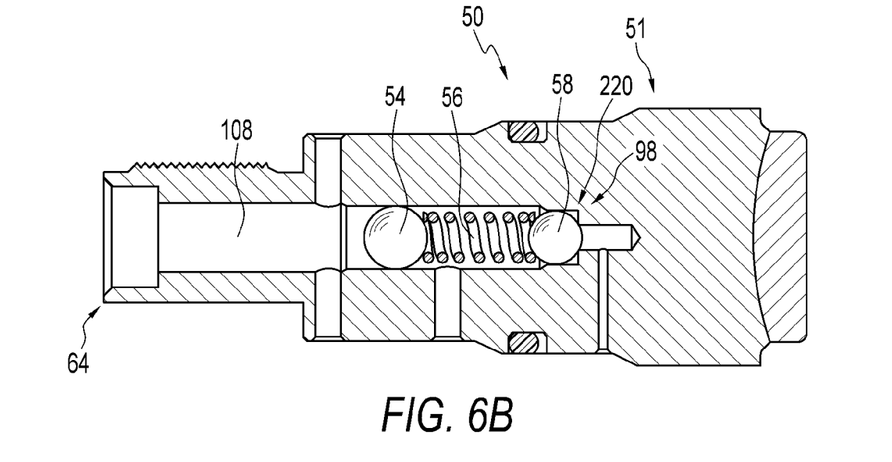

FIGS. 6A and 6B illustrate in greater detail the pressure-fitting of the setting member 54 within the valve body 51 of the valve assembly 50. In FIG. 6A, the valve assembly 50 is placed within an enclosure member 172. The enclosure member 172 has a cavity 173, a first end 174 and second end 175. The valve assembly 50 is placed within the cavity 173 of the enclosure member 172 through the first end 174. The valve assembly 50 is sealably engaged with the enclosure member 172 by o-rings 176 and 177. The enclosure member 172 has an inlet 178 corresponding to inlet port 81 of the valve body 51. The enclosure member 172 has an outlet 179 corresponding to the second outlet port 124 of the valve body 51.

The relief valve member 58 and resilient member 56 are placed within the valve chamber 108. The setting member 54 is placed adjacent to the first outlet port 64 by the second end 132 of the valve chamber 108. A fluid, as indicated by arrow 180, is passed through the valve assembly 51 from the inlet 178 of the enclosure member 172 to the first inlet port 81, through to the second outlet port 124, and then through to the outlet 179 of the enclosure member 172, as indicated by arrow 181. The pressure of the fluid may be monitored by a pressure gauge 184. Next, force as indicated by arrow 182 is applied to the setting member 54. This may be done with a plunger 183 connected to a hydraulic press (not shown). The plunger 183 forces the setting member 54 into the valve chamber 108. When the setting member 54 reaches the resilient member 56, as seen in FIG. 6B, the pressure required for the fluid to pass through the valve assembly 51 increases, since the resilient member 56 presses against the relief valve member 58, pressing it against the relief valve seat 98. Once a target pressure of the fluid is reached as revealed by the pressure gauge 184, movement of the plunger stops and thereby ceases forcing the setting member 54 within the valve chamber 108. Put another way, the force applied to the setting member 54 is increased until the fluid reaches a target pressure. This can be done manually or automatically by sensing the pressure at gauge 184.

Referring to FIG. 6B, the setting member 54 is now pressure fit to operatively engage the resilient member 56 against the relief valve member 58. This results in a relief valve which can be consistently set to a desired relief pressure in a more economically advantageous manner. The extent to which the setting member 54 compresses the resilient member 56 will determine the pressure required at the inlet port 81 to unseat the relief valve member 58 from the relief valve seat 98 and thereby open the relief valve 220. For example, the setting member 54 may be pressure-fit so as to create a valve cracking pressure of 2700 psi for the relief valve member 58.

Referring now in greater detail to the housing member 10 and FIG. 4, the housing member 10 has the housing interior 18, which is hollow. The housing interior 18 has a first end 152. Adjacent to the first end 152 of the housing interior 18 is a cylindrical wall 20. An annular groove 19 extends outwardly from the cylindrical wall 20. The annular groove 19 is so shaped as to receive a c-clip 21. An annular groove 22 also extends outwardly from the cylindrical wall 20 and is so shaped as to receive a third o-ring 23. The housing interior 18 is so shaped as to allow the surface 86 of the valve body 51 to snugly and sealably engage the third o-ring 23. The housing is so shaped as to allow surface 86 to be slidably engageable with surface 20 so as to allow valve body 51 to be positional or movable along axis 156 within the housing interior 18. An inlet 12 of the housing member 10 extends outwardly from the cylindrical wall 20. The inlet 12 may be operatively connected to the bottom 206 of a tilt cylinder 208 as well as bottoms 207 of trim cylinders 209, as illustrated in FIG. 2. Referring back to FIG. 4, the inlet 12 has a cross-section 13 and is so positioned as to communicate with the inlet port 81 of the valve body 51.

A tapered surface 24 of the housing interior 18 extends inwardly from the cylindrical wall 20 and is so shaped as to be sealably engageable with frustoconical surface 84 of the valve body 51. A cylindrical wall 26 extends from the tapered surface 24 of the housing interior 18. The cylindrical wall 26 is so shaped as to allow for a snug and sealable engagement between the cylindrical wall 26 and the first o-ring 60 in the annular groove 76 of the valve body 51. The cylindrical wall 26 is so shaped as to otherwise allow for the cylindrical wall 82 of the valve body 51 to be slidably positional within the housing interior 18. The frustoconical surface 74 of the valve body 51 ensures that the cylindrical wall 72 of the valve body 51 does not contact cylindrical wall 26 of the housing interior 18.

A second outlet 16 of the housing member 10 extends from the cylindrical wall 26. The second outlet 16 may operatively connect to the reservoir 230, as illustrated in FIG. 2, for a tilt and trim system. Referring back to FIG. 4, the second outlet 16 has a cross-section 17 and is so positioned as to communicate with the second outlet port 124.

Extending inwardly from the cylindrical wall 26 is an end wall 28. The end wall 28 is so shaped as to abut the transverse wall 71 of the valve body 51. A tapered wall 30 extends inwardly from the end wall 28. The tapered wall 30 is so shaped as to snugly and sealably engage the second o-ring 52, which is in annular groove 70 of the valve body 51. A tapered wall 31 extends inwardly from tapered wall 30. Extending past the tapered wall 31 is a surface 32. Threading 133 extends along surface 32. The housing interior 18 is so shaped as to allow the threading 133 of the surface 32 to threadingly engage the threading 67 on surface 68 of the valve body 51. This thereby allows the valve body 51 to be threadingly engageable and positionable within the housing interior 18. The combination of the threading 133 of the housing 10 and the non-threaded portion 73 of the valve body 51 form a passage 69.

Extending inwardly from surface 32 is an end wall 34. The end wall 34 coincides with a second end 153 of the housing interior 18. The first outlet 14 of the housing member 10 extends from the end wall 34. The first outlet 14 may operatively connect to the top 204 of the tilt cylinder 208, as illustrated in FIG. 2. Referring back to FIG. 4, the first outlet 14 of the housing member 10 is adjacent to and corresponds with the first outlet port 64 of the valve body 51. The first outlet 14 has a cross-section 15.

Figure 5:
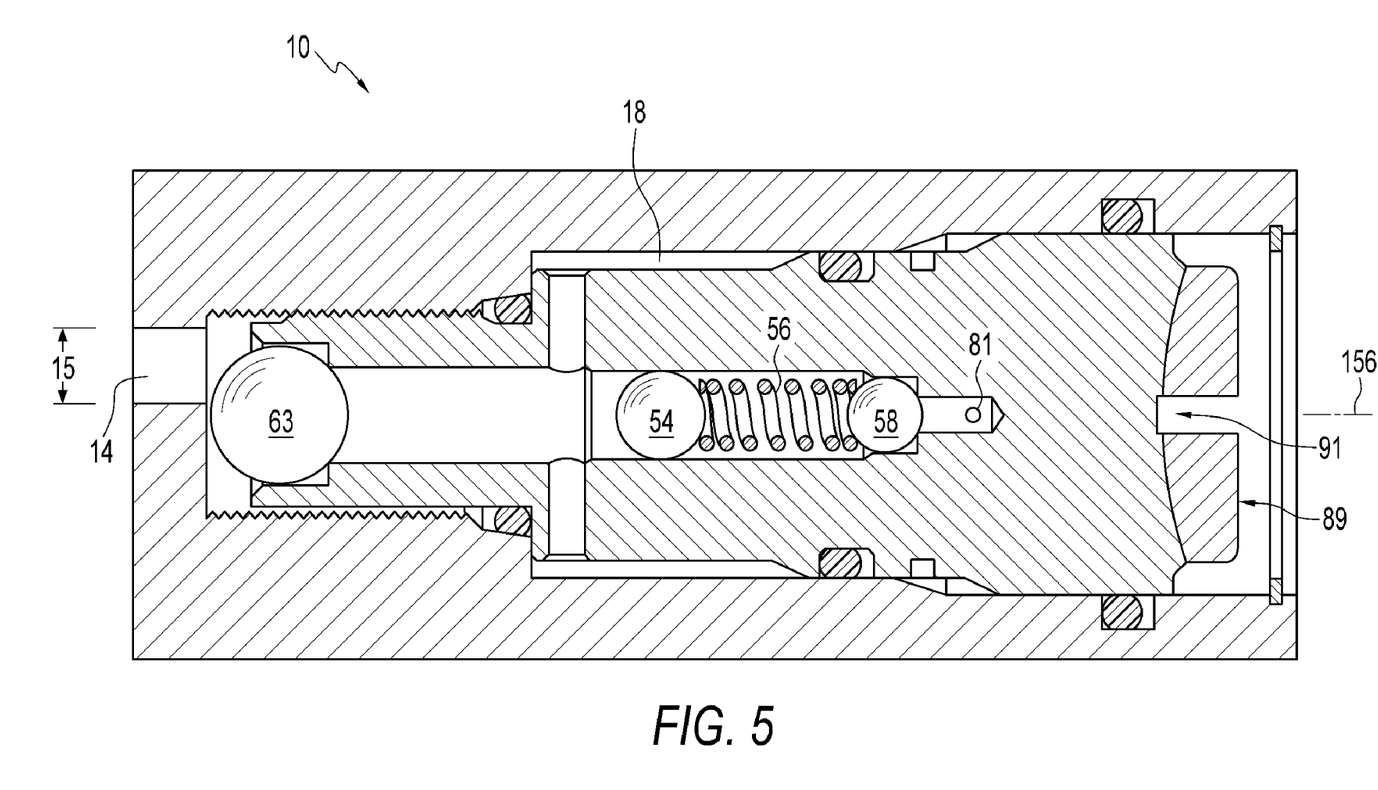
FIG. 5 is a sectional top view of the embodiment of the invention illustrated in FIG. 4.

Referring now to FIG. 5 which illustrates a top sectional view of the embodiment of FIG. 4, the first outlet 14 is located at an offset to the longitudinal axis 156. This offset ensures that the first outlet 14 does not plug the check valve member 63.

Figure 7:
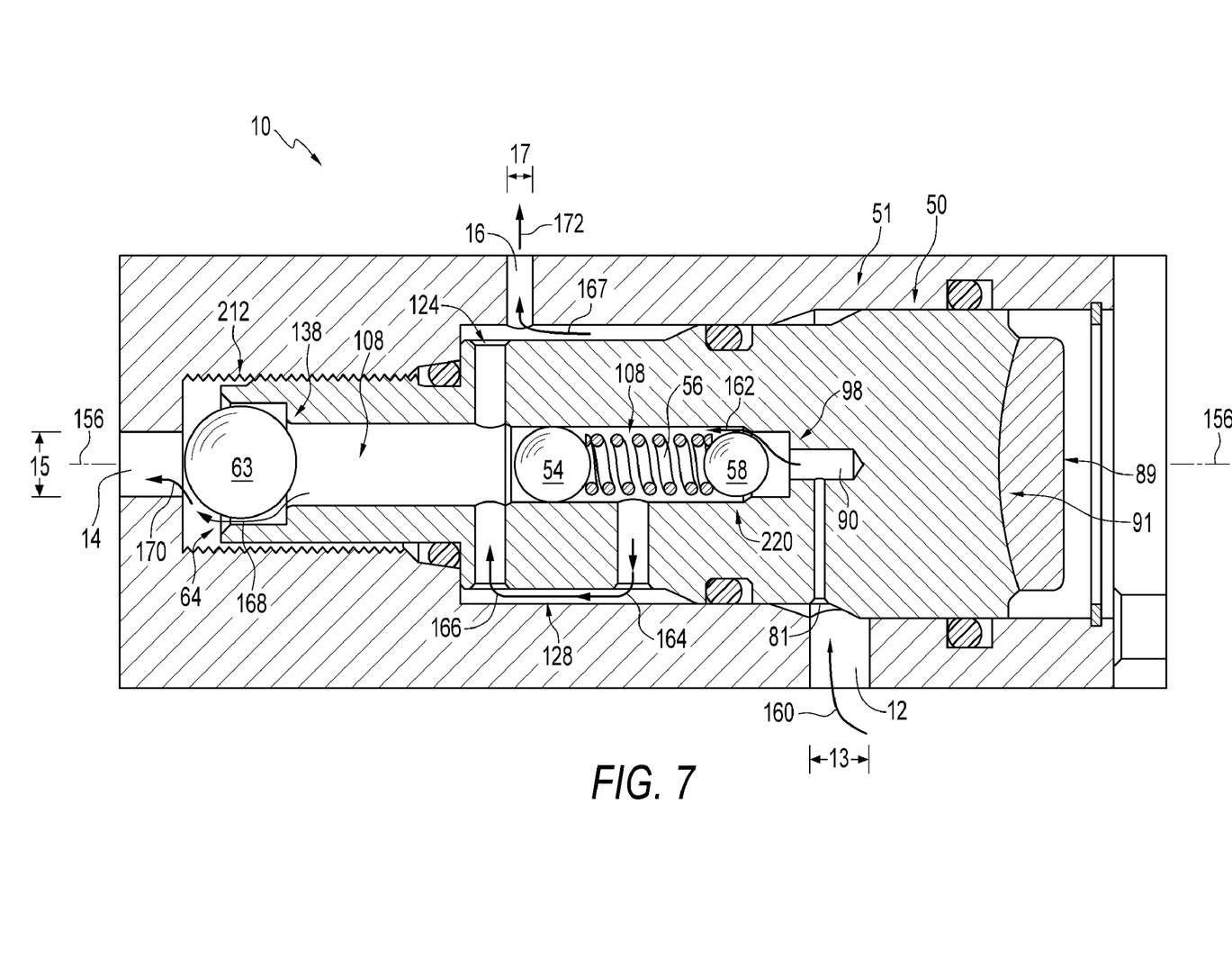
FIG. 7 is a sectional side view of the embodiment illustrated in FIG. 4 where the check valve member and relief valve member are disengaged from their respective valve seats.

In operation and referring now to FIG. 7, pressurized fluid as indicated by arrow 160 enters the inlet 12 of the housing member 10. The pressurized fluid may come from the bottom 206 of tilt cylinder 208 of FIG. 2 that requires tilt relief. Alternatively or in addition, the pressurized fluid may come from the bottom 207 of a trim cylinder 209 that requires trim relief. Referring again to FIG. 7, the pressurized fluid enters past the inlet port 81 of the valve body 51 and into the inlet bore 90. Where pressurized fluid is of sufficient pressure to disengage the relief valve member 58 from the relief valve seat 98, namely, the target pressure, pressurized fluid as indicated by arrow 162 flows past the relief valve member 58 and into the valve chamber 108. The pressurized fluid as indicated by arrows 164, 166 and 167 flows through passageway 128. Pressurized fluid in part passes through the passageway 128, as well as through the valve chamber 108 by means of the second outlet port 124, to the second outlet 16 of the housing member 10. This pressurized fluid may then go to the reservoir 230, as illustrated in FIG. 2.

Referring back to FIG. 7, the pressurized fluid in the valve chamber 108 also in part engages against the check valve member 63. The pressurized fluid in this example is of sufficient pressure to disengage the check valve member 63 from the check valve seat 138. As a result, pressurized fluid as indicated by arrow 168 and 170 flows past the check valve member 63, through first outlet port 64 to the first outlet 14 of the housing member 10. This fluid may then transfer to the top 204 of the tilt cylinder 208, as illustrated in FIG. 2.

Two examples where the check valve member 63 opens are for: 1) thermal or pressure tilt relief; and 2) impact relief. For thermal or pressure tilt relief, there is high pressure in the tilt cylinder 208 shown in FIG. 2. This may be due to thermal expansion of the fluid. The high pressure expands the fluid in the tilt cylinder 208. In this situation, the check valve member 63 cracks open to allow fluid entering inlet 12 of the housing member 10 to pass from the bottom 206 of the tilt cylinder to the top 204 of the tilt cylinder 208. The difference in volume of the fluid between the bottom 206 and top 204 of the tilt cylinder 208 means that the valve assembly 50 also dumps excess fluid to the reservoir 230 via second outlet 16.

Another scenario in which the check valve member 63 opens is for impact relief. In this scenario, the tilt cylinder 208 suddenly moves to the top of the stroke due to an impact of an outboard motor for example with an obstacle. After reaching the top of the stroke, the tilt piston 210 lowers down, from the perspective of FIG. 2, displacing the fluid in the bottom 206 of the tilt cylinder 208. This displaced fluid in turn displaces the fluid in the trim cylinders 209. This in turn causes the trim pistons 211 to be pushed up to the top of their stroke. In order for this to take place without generating backpressure, fluid needs to pass through to the top 204 of the tilt cylinder 208. The check valve 212 therefore cracks open.

Figure 8:
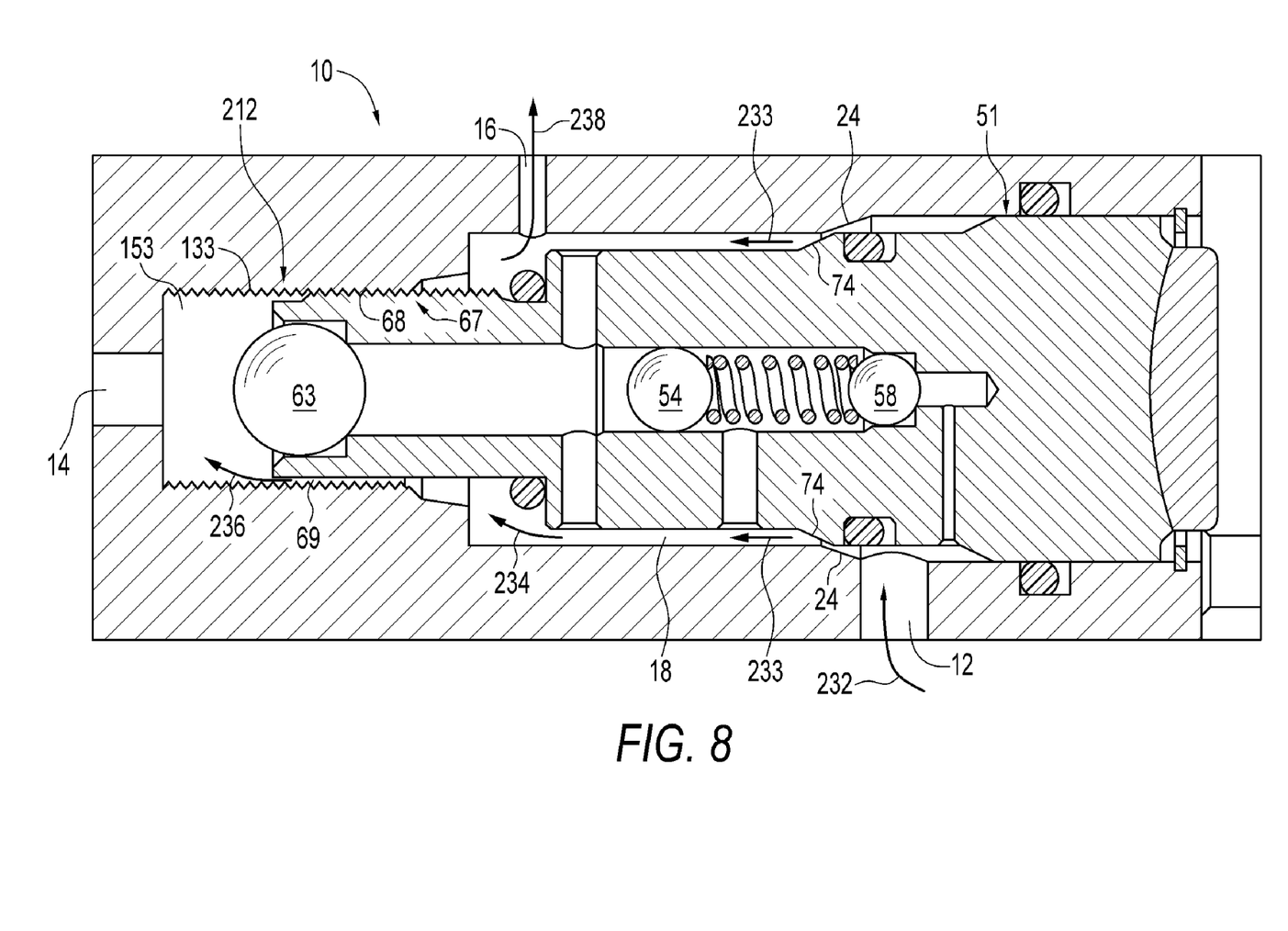
FIG. 8 is a sectional side view of the embodiment illustrated in FIG. 4 where the check and relief valve is in a manual release mode with flow control.

A further aspect of the invention is the manual release mode of combination check and relief valve. In this regard, FIG. 8 illustrates the manual release mode of the invention with flow control. The valve body 51 at threading 67 is partially disengaged from the threading 133 of the housing member 10. In one example, a screw driver (not shown) may be used to engage groove 91, best illustrated in FIG. 5, to so position the valve body 51. This thereby moves the valve body 51 from left to right, from the perspective of FIGS. 4, 5 and 8.

In FIG. 8, the valve body 51 is so partially disengaged from the threading 133, away from the second end 153 of the housing interior 18, that fluid indicated by arrow 232 may enter the inlet 12 of the housing member 10 and bypasses the relief valve member 58. Because the relief valve member 58 is not used or disengaged from its seat, the fluid need not be pressurized for operating the manual release feature of the valve. The fluid passes in between frustoconical surface 74 and tapered surface 24 and then continues as indicated arrow 233. The frustoconical surface 74 and tapered surface 24 act to restrict the flow of fluid that may pass into the interior 18 of the housing member 10. The fluid then proceeds through the interior 18 of the housing member 10 as indicated by arrow 234. The fluid then passes through passage 69 and outwards to the first outlet 14 and second outlet 16, as indicated by arrows 236 and 238. The more the valve body 51 is threadably disengaged and thereby moved from the left to right from the perspective of the figures, the greater the separation that is provided between the frustoconical surface 74 and tapered surface 24. This therefore enables a greater amount of fluid to pass through the housing member 10. In other words, the extent of fluid flowing through the housing member 10 varies as a function of the extent to which the valve body 51 is threadably positioned from left to right, according to the perspective of the figures. The surfaces 74 and 24 therefore provide a flow meter function which enables controlled movement of an outboard engine when the groove 91 is manually actuated with, for example, a screw driver. This manual release feature thereby allows for controlled movement of an outboard engine.

Figure 9:
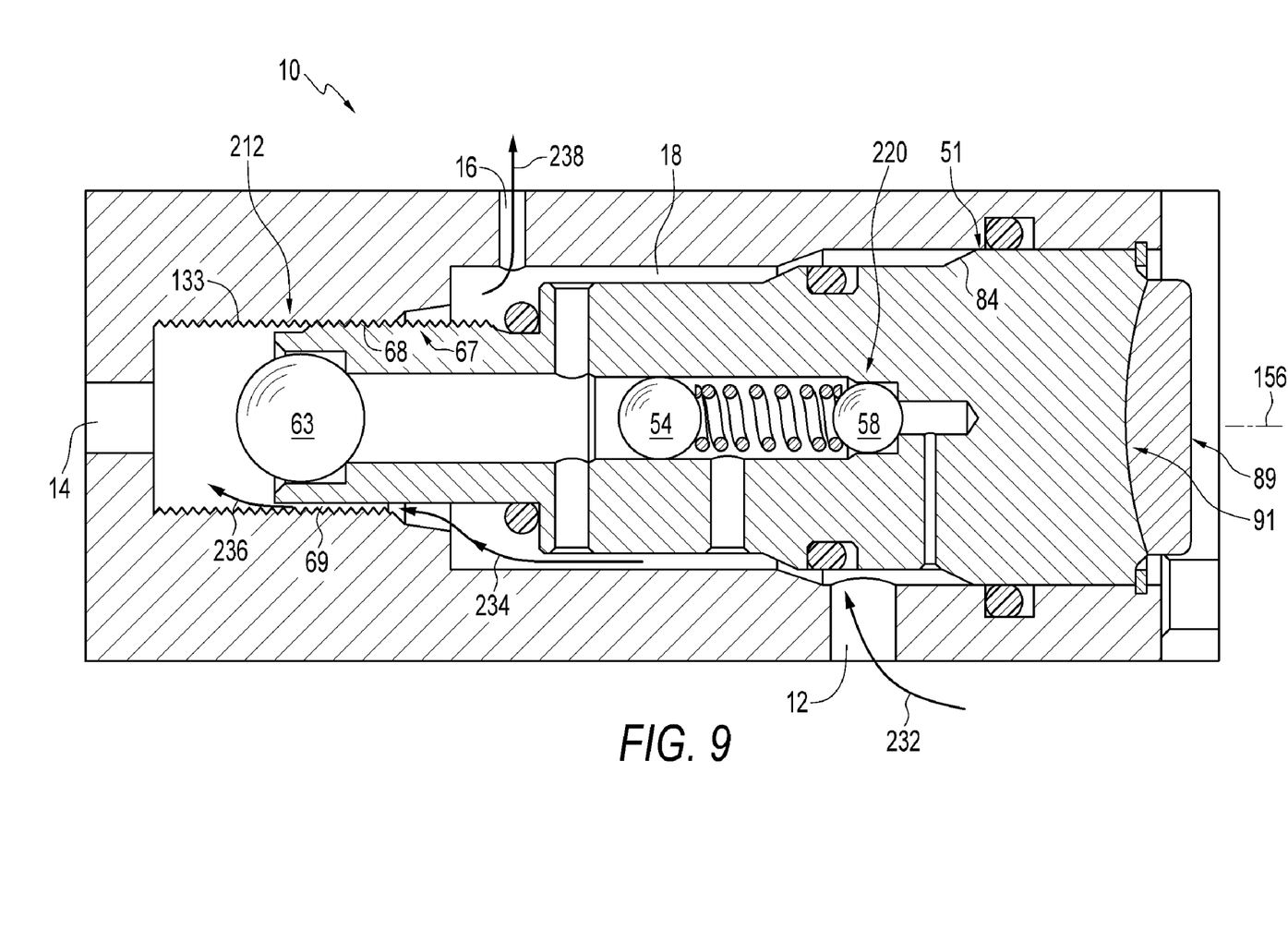
FIG. 9 is a sectional side view of the embodiment illustrated in FIG. 4 where the check and relief valve is in full manual release mode.

FIG. 9 illustrates the full manual release mode of the invention. The valve body 51 is at a maximum threadable disengagement. As a result, the maximum amount of fluid as indicated by arrow 232 may enter the inlet 12 of the housing member 10 and bypasses the relief valve member 58. This provides the advantage of allowing for even quicker movement of the outboard engine.

Figure 10:
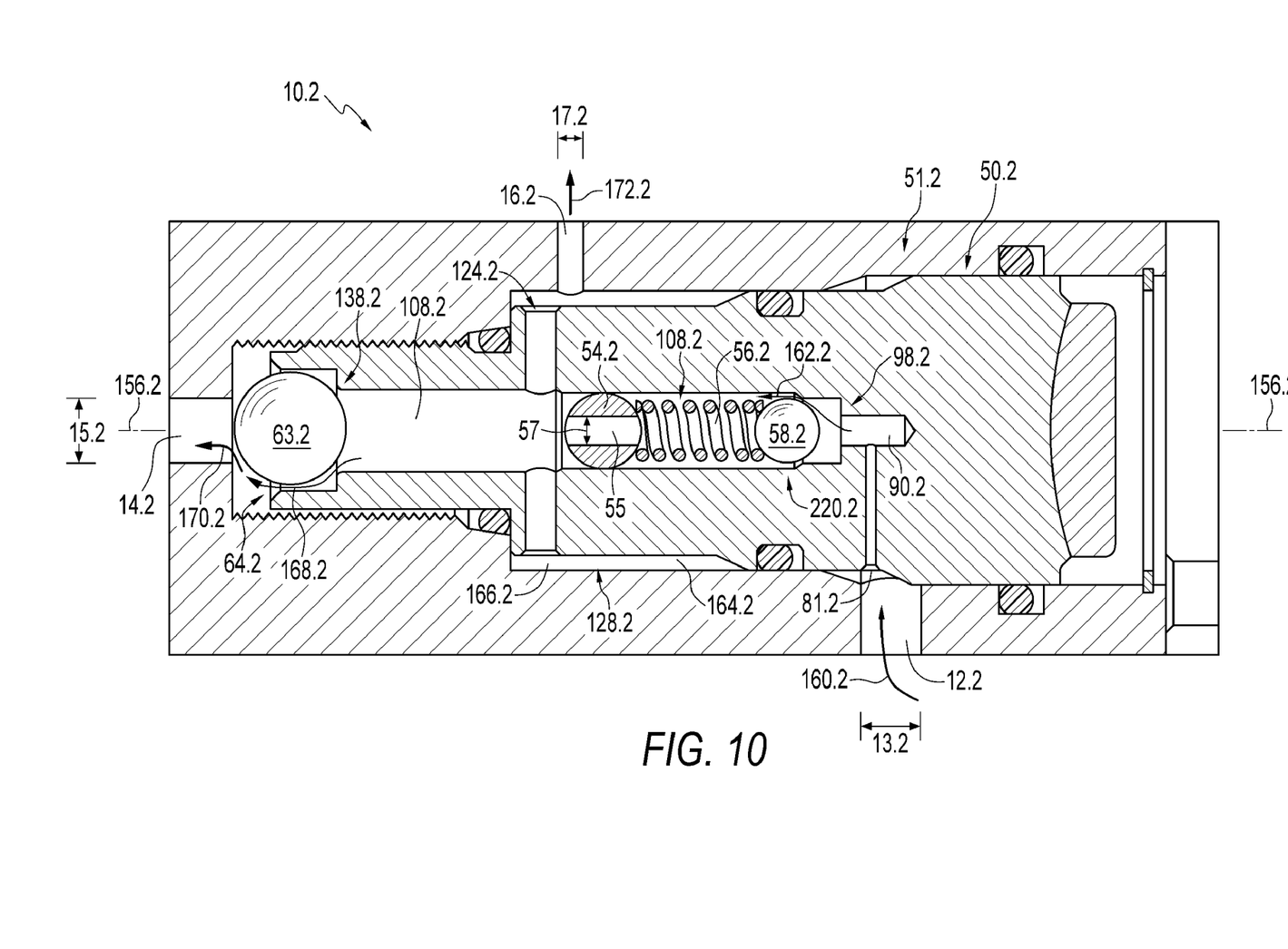
FIG. 10 is a sectional side view of another embodiment according to an aspect of the invention where the setting member has a passageway.

Lastly, FIG. 10 illustrates a variation to the above embodiment and modes, where like parts have like numbers with the additional numeral designation "0.2". Here the setting member 54.2 has an passageway 55 with a cross-section 57. The passageway 55 may be formed by drilling a hole through the setting member 54.2. For example, the passageway 55 may be created by pre-drilling a hole through the setting member 54.2 before the setting member 54.2 is set within the valve assembly 50.2. Alternatively, the passageway 55 may be created by drilling a hole through the setting member 54.2 once the setting member 54.2 is set within the valve assembly 50.2.

The addition of the passageway 55 means that the first interior conduit, illustrated as numeral 122 in FIG. 4, is no longer required for the valve assembly 50.2 as illustrated in FIG. 10. This is because pressurized fluid entering the valve chamber 108.2 may now pass through passageway 55 when on its way to the first outlet 14.2 and the second outlet 16.2.

It will be understood by someone skilled in the art that many of the details provided above are by way of example only and are not intended to limit the scope of the invention which is to be determined with reference to the following claims.

What is claimed is:

1. A combination check and relief valve apparatus, the apparatus comprising:
   a housing member, the housing member having an inlet, a first outlet, a second outlet and a hollow housing interior;
   a valve body, the valve body being within the housing interior, the valve body having an inlet port, a first outlet port, and a second outlet port, the inlet port being in communication with the inlet of the housing member, the first outlet port being adjacent to the first outlet of the housing member, and the second outlet port being in communication with the second outlet of the housing member;
   a valve chamber, the valve chamber being within the valve body;
   a check valve member, the check valve member being operatively interposed between the first outlet port of the valve body and the first outlet of the housing member;
   a check valve seat, the check valve member being biased towards the check valve seat when fluid pressure is applied to the first outlet;
   a relief valve member, the relief valve member being within the valve chamber, the relief valve member being operatively interposed between the inlet port and the first outlet port and being operatively interposed between the inlet port and the second outlet port;
   a resilient member, the resilient member having a first end and a second end, the first end of the resilient member operatively engaging the relief valve member;
   a setting member, the setting member being pressure-fit within the valve chamber and operatively engaging the second end of the resilient member; and
   a relief valve seat, the resilient member being resiliently biased between the setting member and the relief valve member to bias the relief valve member against the relief valve seat;
   whereby the setting member is so pressure-fit that when a fluid having a pressure equal to or greater than a target pressure communicates with the inlet port of the valve body, the resilient member is compressed, the relief valve member thereby disengages from the relief valve seat to enable the fluid to pass through the valve chamber, said fluid disengages the check valve member from the check valve seat so that the fluid in part passes through to the first outlet of the housing member, and the fluid in part passes through the valve chamber to the second outlet of the housing member.

2. The combination check and relief valve as claimed in claim 1, wherein the valve chamber is an interior bore and the setting member is pressure-fit within the interior bore.

3. The combination check and relief valve as claimed in claim 2, wherein the setting member is a setting ball.

4. The combination check and relief valve as claimed in claim 3, wherein the relief valve member is a relief valve ball, the relief valve ball having a smaller cross-section than that of the interior bore.

5. The combination check and relief valve as claimed in claim 4, wherein the check valve member is a check valve ball, the check valve ball having a larger cross-section than that of the interior bore.

6. The combination check and relief valve as claimed in claim 1, wherein the valve chamber is an interior bore, the interior bore having a first end and a second end, the first end of the interior bore being in communication with the relief valve member, and wherein an inlet bore extends from the first end of the interior bore, the inlet bore having a smaller cross-section than that of the interior bore, the relief valve seat being interposed between the interior bore and the inlet bore.

7. The relief valve as claimed in claim 6, wherein the relief valve seat comprises the first end of the interior bore in combination with the inlet bore.

8. The combination check and relief valve as claimed in claim 6, the second end of the interior bore being in communication with the check valve member, and wherein a first outlet bore extends from the second end of the interior bore, the first outlet bore having a larger cross-section than that of the interior bore, the check valve seat being interposed between the interior bore and the first outlet bore.

9. The relief valve as claimed in claim 8, wherein the check valve seat comprises the second end of the interior bore in combination with the first inlet bore.

10. The combination check and relief valve as claimed in claim 1, wherein the check and relief valve further has a passageway, the passageway being so placed as to allow communication between both the inlet of the housing member and the first outlet of the housing member, and the inlet of the housing member and the second outlet of the housing member, upon the relief valve member being disengaged from the relief valve seat and the check valve member being disengaged from the check valve seat.

11. The combination check and relief valve as claimed in claim 10, wherein the setting member is a setting ball.

12. The combination check and relief valve as claimed in claim 1, wherein the second outlet of the housing member has a smaller cross-sectional area than that of the first outlet of the housing member.

13. The combination check and relief valve as claimed in claim 12, wherein the inlet of housing member has a cross-sectional area substantially similar to that of the first outlet of the housing member.

14. The combination check and relief valve as claimed in claim 1, wherein the valve body is positionable within the housing interior from a closed position to an open position, the closed position inhibiting communication between the inlet of the housing member and both the first outlet of the housing member and the second outlet of housing member, the open position of the valve body enabling the inlet of the housing member to be in communication the first outlet of the housing member and the second outlet of housing member, the open position thereby allowing for a manual release of fluid through the combination check and relief valve.

15. The combination check and relief valve as claimed in claim 14, wherein the valve body is positionable within the housing interior by means of threading.

16. The combination check and relief valve as claimed in claim 15, further including a tapered surface from the group consisting of the valve body and the housing member, the tapered surface being so placed as to control the manual release of fluid as a function of the position of the valve body within the housing member.

17. The combination check and relief valve as claimed in claim 1, wherein the resilient member is a coil spring.

18. A combination check and relief valve system for tilt and trim relief of a hydraulic cylinder, the system comprising:
   a housing member, the housing member having an inlet, a first outlet, a second outlet and a hollow housing interior;
   a valve body, the valve body being within the housing interior, the valve body having an inlet port, a first outlet port, and a second outlet port, the inlet port being in communication with the inlet of the housing member, the first outlet port being adjacent to the first outlet of the housing member, and the second outlet port being in communication with the second outlet of the housing member;
   a valve chamber, the valve chamber being within the valve body;
   a check valve member, the check valve member being operatively interposed between the first outlet port of the valve body and the first outlet of the housing member;
   a check valve seat, the check valve member being biased towards the check valve seat when fluid pressure is applied to the first outlet;
   a relief valve member, the relief valve member being within the valve chamber, the relief valve member being operatively interposed between the inlet port and the first outlet port and being operatively interposed between the inlet port and the second outlet port;
   a resilient member, the resilient member having a first end and a second end, the first end of the resilient member operatively engaging the relief valve member;
   a setting member, the setting member being pressure-fit within the valve chamber and operatively engaging the second end of the resilient member; and
   a relief valve seat, the resilient member being resiliently biased between the setting member and the relief valve member to bias the relief valve member against the relief valve seat;
whereby the setting member is so pressure-fit that when a fluid having a pressure equal to or greater than a target pressure communicates with the inlet port of the valve body, the resilient member is compressed, the relief valve member thereby disengages from the relief valve seat to enable the fluid to pass through the valve chamber, said fluid disengages the check valve member from the check valve seat so that the fluid in part passes through to the first outlet of the housing member, and the fluid in part passes through the valve chamber to the second outlet of the housing member.

* * * * *